US008210100B2

(12) United States Patent
Nevarez et al.

(10) Patent No.: US 8,210,100 B2
(45) Date of Patent: *Jul. 3, 2012

(54) COOKING APPARATUS AND METHOD WITH PRODUCT RECOGNITION

(75) Inventors: Roberto Nevarez, Hudson, FL (US);
Douglas S. Jones, New Port Richey, FL (US); Jan Claesson, Land O' Lakes, FL (US); Ryan J. Stephens, Dallas, PA (US); David W. Harter, New Port Richey, FL (US)

(73) Assignee: Enodis Corporation, New Port Richey, FL (US)

( * ) Notice: Subject to any disclaimer, the term of this patent is extended or adjusted under 35 U.S.C. 154(b) by 1192 days.

This patent is subject to a terminal disclaimer.

(21) Appl. No.: 11/375,759

(22) Filed: Mar. 15, 2006

(65) Prior Publication Data
US 2006/0254430 A1    Nov. 16, 2006

Related U.S. Application Data

(63) Continuation-in-part of application No. 11/070,348, filed on Mar. 2, 2005, now Pat. No. 8,109,202.

(60) Provisional application No. 60/662,041, filed on Mar. 15, 2005, provisional application No. 60/549,233, filed on Mar. 2, 2004.

(51) Int. Cl.
*A47J 37/06* (2006.01)
*H05B 3/06* (2006.01)

(52) U.S. Cl. ......................................... 99/349; 219/524

(58) Field of Classification Search ............ 99/327–334, 99/349–351, 348, 372–391, 400–401, 444–450, 99/485; 426/520–523; 219/521–525, 386
See application file for complete search history.

(56) References Cited

U.S. PATENT DOCUMENTS

| 3,948,159 | A | * | 4/1976 | Vigerstrom ..................... 99/358 |
| 4,483,239 | A | * | 11/1984 | Mueller et al. .................. 99/340 |
| 4,627,335 | A | | 12/1986 | Sherman et al. ................ 99/325 |
| RE32,994 | E | | 7/1989 | Adamson et al. ............... 99/332 |
| 5,473,976 | A | | 12/1995 | Hermansson ................... 99/349 |

(Continued)

FOREIGN PATENT DOCUMENTS
JP         57114342 A       7/1982
(Continued)

OTHER PUBLICATIONS

International Search Report and Written Opinion dated Jul. 7, 2008 based on PCT application No. PCT/US06/09352.

(Continued)

*Primary Examiner* — Sang Paik
(74) *Attorney, Agent, or Firm* — Ohlandt, Greeley, Ruggiero & Perle, L.L.P.

(57) ABSTRACT

Cooking apparatus having first and second platens with product recognition. A positioning mechanism moves the second platen toward the first. A detector senses the second platen making contact with a food product disposed on the first platen and provides a signal. A controller uses the signal to measure the travel distance of the second platen. The product thickness is a function of the travel distance, which is used to select a cooking procedure for the food product. The controller then executes the selected cooking procedure to cook the food product. The detector can include a micro switch, proximity sensor, touch sensor, strain sensor, thermal sensor, optical sensor, sonar sensor or positioning load change sensor.

13 Claims, 15 Drawing Sheets

U.S. PATENT DOCUMENTS

| | | | |
|---|---|---|---|
| 5,555,794 A | 9/1996 | Templeton et al. | 99/349 |
| 5,847,365 A | 12/1998 | Harter et al. | 219/492 |
| 5,934,182 A | 8/1999 | Harter et al. | 99/349 |
| 6,016,743 A | 1/2000 | Glavan | 99/349 |
| 6,079,321 A | 6/2000 | Harter et al. | 99/349 |
| 6,148,718 A | 11/2000 | D'Alterio | 99/349 |
| 6,201,218 B1 | 3/2001 | Chandler et al. | 219/388 |
| 6,263,786 B1 * | 7/2001 | Raio et al. | 99/349 |
| 6,281,478 B2 | 8/2001 | Chandler et al. | 219/388 |
| 6,401,601 B1 * | 6/2002 | Wu | 99/331 |

FOREIGN PATENT DOCUMENTS

| | | |
|---|---|---|
| JP | 64-40017 | 3/1989 |
| JP | 8202451 A | 8/1996 |
| JP | 10-309236 | 11/1998 |
| JP | 11009466 A | 1/1999 |
| JP | 2001250462 A | 9/2001 |
| SU | 1558291 | 4/1990 |

OTHER PUBLICATIONS

Communication dated Nov. 24, 2009 issued by the Russian Federation Patent Office in corresponding Russian Patent Application No. 2007138008/12.

English translation of Communication dated Feb. 14, 2011 from the Japanese Patent Office in corresponding Patent Application No. 2007-501933.

* cited by examiner

Beam can move downward after platen casing and platen stop on product. Fastener is mounted to platen cover, and floats in Beam allowing travel of beam Platen motion to be stopped by product.

COOKING APPARATUS AND METHOD WITH PRODUCT RECOGNITION

RELATED APPLICATION

This application claims the benefit of U.S. Provisional Patent Application Ser. No. 60/662,041, filed on Mar. 15, 2005 and is a continuation-in-part of U.S. patent application Ser. No. 11/070,348, filed on Mar. 2, 2005, now U.S. Pat. No. 8,109,202, which application claims the benefit of U.S. Provisional Patent Application Ser. No. 60/549,233, filed on Mar. 2, 2004.

FIELD OF THE INVENTION

This invention relates to a cooking apparatus and method based on food product thickness and/or recognition thereof.

BACKGROUND OF THE INVENTION

Cooking apparatus that includes two surfaces generally cooks by contacting opposed sides of a food product. Cooking apparatus of this type has been used in a variety of cooker styles. For example, a clam grill uses a lower platen and an upper platen that is moveable toward and away from the lower platen. Examples of clam grills are disclosed in U.S. Pat. Nos. 6,079,321 and Re 32,994. Another style is a toaster in which one surface is a platen and the other surface is a conveyor belt. The conveyor belt and the platen can be either horizontal, vertical or at an angle therebetween. Examples of toasters are disclosed in U.S. Pat. Nos. 6,201,218 and 6,281,478.

These known cooking apparatuses generally include a motion mechanism that either manually or automatically moves one platen toward another until opposed sides of the food product are contacted by the platens. For example, the clam grill disclosed in U.S. Pat. No. 6,079,321 automatically controls the motion based on a set of parameters that must be input to a controller for each type of food product. These parameters include a preset gap distance, which is the cooking distance between the two platens to accommodate food products of different thicknesses. These gap distances are set by manually inputting the preset gap distance setting into the grill control and assigning the setting to a gap button on the user interface control along with a cooking time. This set of cooking parameters (gap distance and cooking time) must be preselected before placing the food product on the grill surface.

The clam grill operator must also input the type of food product being cooked so that the controller uses the parameter set for that food product. Should the operator inadvertently input the wrong type, the upper platen may not contact the food product or may put too much pressure on the food product. Since the parameter set also includes the cook time for the food product type, the food product could be undercooked or over cooked. Thus, there is opportunity for human error at the time of entry of the preset gap distances as well as at the time of selecting the type of food being cooked.

There is a need for a cooking apparatus that automatically controls the relative motion of the two platens in a manner that avoids user error.

SUMMARY OF THE INVENTION

The cooking apparatus of the present invention comprises a first platen and a second platen disposed in spaced apart relationship to one another. A positioning mechanism moves the second platen toward and/or away from the first platen. A controller is responsive to the second platen making contact with a food product disposed on the first platen when the second platen is moved by the positioning mechanism toward the first platen to recognize the food product.

In one embodiment of the cooking apparatus of the present invention, the controller determines a cook time for the food product based on the recognized thickness and a user entered category of the food product.

In another embodiment of the cooking apparatus of the present invention, the cook time is determined by the product of the square of the product thickness multiplied by a constant related to the food category.

In another embodiment of the cooking apparatus of the present invention, the recognized thickness is derived from a travel distance of the second platen.

In another embodiment of the cooking apparatus of the present invention, the travel distance is derived from a predetermined reference point and a non-cooking position of the second platen.

In another embodiment of the cooking apparatus of the present invention, the cooking apparatus further comprises a detector disposed to provide a signal as the second platen, when moved by the positioning mechanism toward the first platen, makes contact with the food product disposed on the first platen. The controller responds to the signal, thereby recognizing the food product.

In another embodiment of the cooking apparatus of the present invention, the controller executes a cooking procedure to cook one or more food products disposed on a grill surface of the first platen with the second platen having a first cooking position based on a first thickness of the food products. The controller during the cooking procedure raises and lowers the positioning mechanism and/or the second platen.

In another embodiment of the cooking apparatus of the present invention, the controller executes a product thickness change control during the cooking procedure to determine a second cooking position based on a second thickness thereof and to lower the positioning mechanism and/or the second platen to the second cooking position.

In another embodiment of the cooking apparatus of the present invention, the cooking apparatus further comprises a detector disposed to provide a signal as the second platen makes contact with the food products. The controller responds to a first indication and a second indication of the signal to move the positioning mechanism and/or the second platen into the first and second positions, respectively.

In another embodiment of the cooking apparatus of the present invention, the product thickness change control causes the controller to raise the positioning mechanism and/or the second platen from the first cooking position and, based on the second indication of the signal, causes the controller to move the positioning mechanism and/or the second platen to the second cooking position.

In another embodiment of the cooking apparatus of the present invention, the raising and lowering is done in a manner to release moisture from the food products.

In another embodiment of the cooking apparatus of the present invention, the controller executes a moisture release control during the cooking procedure that raises the positioning mechanism and/or the second platen to a predetermined distance above a grill surface of the first platen, holds the second platen at the predetermined distance for a time T, and when the time T expires, lowers the positioning mechanism and/or the second platen toward the first platen.

The method of the present invention cooks a food product with a cooking apparatus that has first and second platens. The method comprises moving the second platen toward the first platen and in response to the second platen making contact with a food product disposed on the first platen, recognizing the food product due to its thickness.

In one embodiment of the method of the present invention, based on the recognized food product and a user entered food category of the food product, a cook time for the food product is determined.

In another embodiment of the method of the present invention, the cook time is determined by the product of the square of the product thickness multiplied by a constant related to the food category.

In another embodiment of the method of the present invention, the thickness is derived from a travel distance of the second platen.

In another embodiment of the method of the present invention, the travel distance is derived from a predetermined reference point and a non-cooking position of the second platen.

In another embodiment of the method of the present invention, the method further comprises providing a signal as the second platen, when moved by the positioning mechanism toward the first platen, makes contact with the food product. The recognizing step uses the signal to recognize the food product due to its thickness.

In another embodiment of the method of the present invention, the method further comprises, based on the thickness, moving the second platen to a first cooking position, executing a cooking procedure to cook the food product and, during the cooking procedure, raising and lowering the second platen.

In another embodiment of the method of the present invention, the method further comprises determining a second cooking position based on a second thickness of the food product and moving the second platen to the second cooking position.

In another embodiment of the method of the present invention, the method further comprises providing a signal as the second platen makes contact with the food product; and in response to a first indication and a second indication of the signal to move the second platen into the first and second positions, respectively.

In another embodiment of the method of the present invention, the method further comprises raising the second platen from the first cooking position and, based on the second indication of the signal, moving the second platen to the second cooking position.

In another embodiment of the method of the present invention, the raising and lowering is done in a manner to release moisture from the food products.

In another embodiment of the method of the present invention, during the cooking procedure the second platen is raised to a predetermined distance above a grill surface of the first platen. The second platen is held at the predetermined distance for a time T. When the time T expires, the second platen is lowered toward the first platen.

BRIEF DESCRIPTION OF THE DRAWINGS

Other and further objects, advantages and features of the present invention will be understood by reference to the following specification in conjunction with the accompanying drawings, in which like reference characters denote like elements of structure and.

DESCRIPTION OF THE PREFERRED EMBODIMENT

It is contemplated that the present invention can be used in various styles of two-surfaced cooking apparatus, for example, two-sided contact toasting, clam grills and the like. However, by way of example and completeness of description, the present invention will be described herein in a clam grill embodiment.

Figure 1:
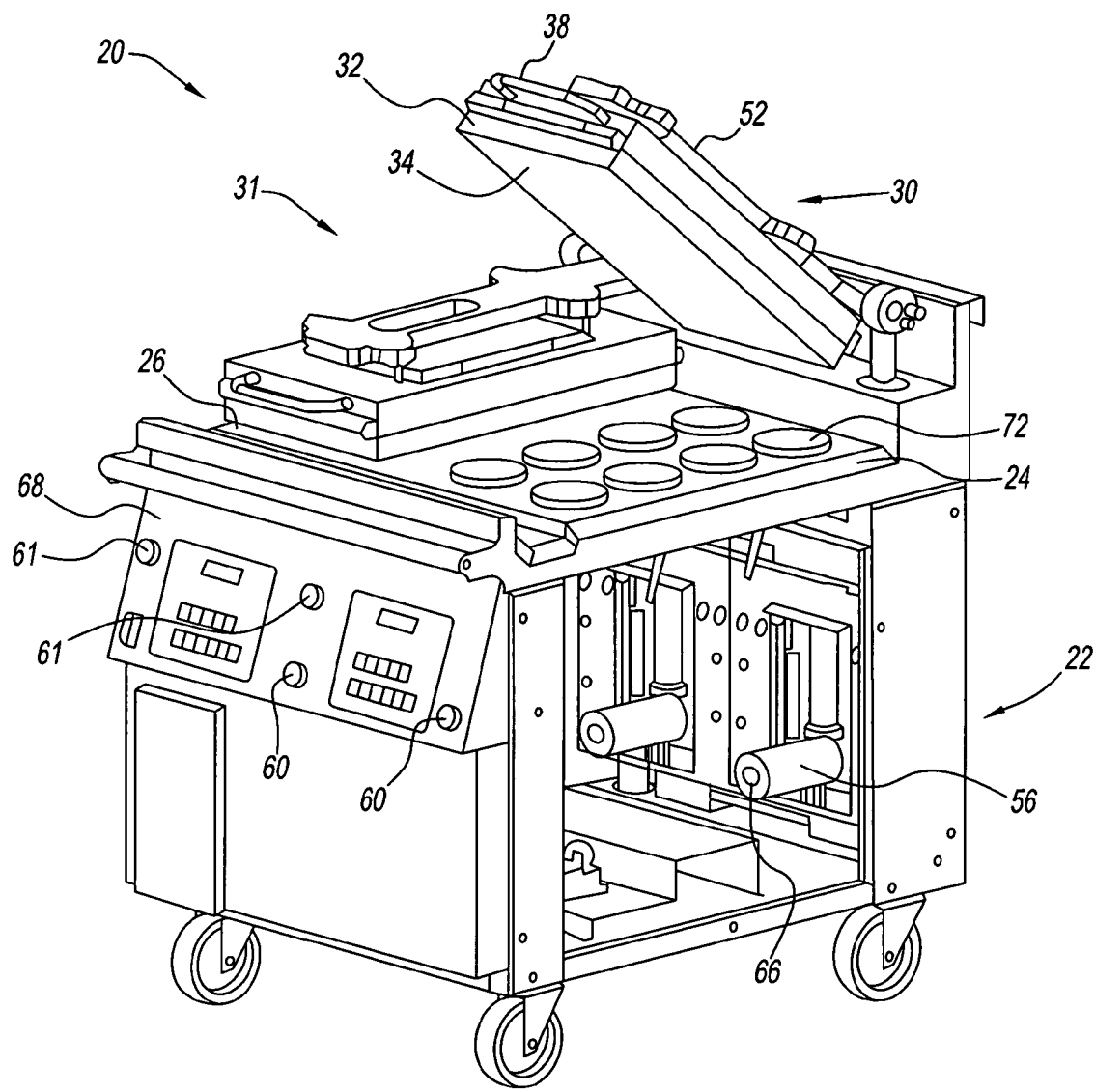
FIG. 1 is a perspective view of one embodiment of a two-surfaced cooking apparatus of the present invention.
Figure 2:
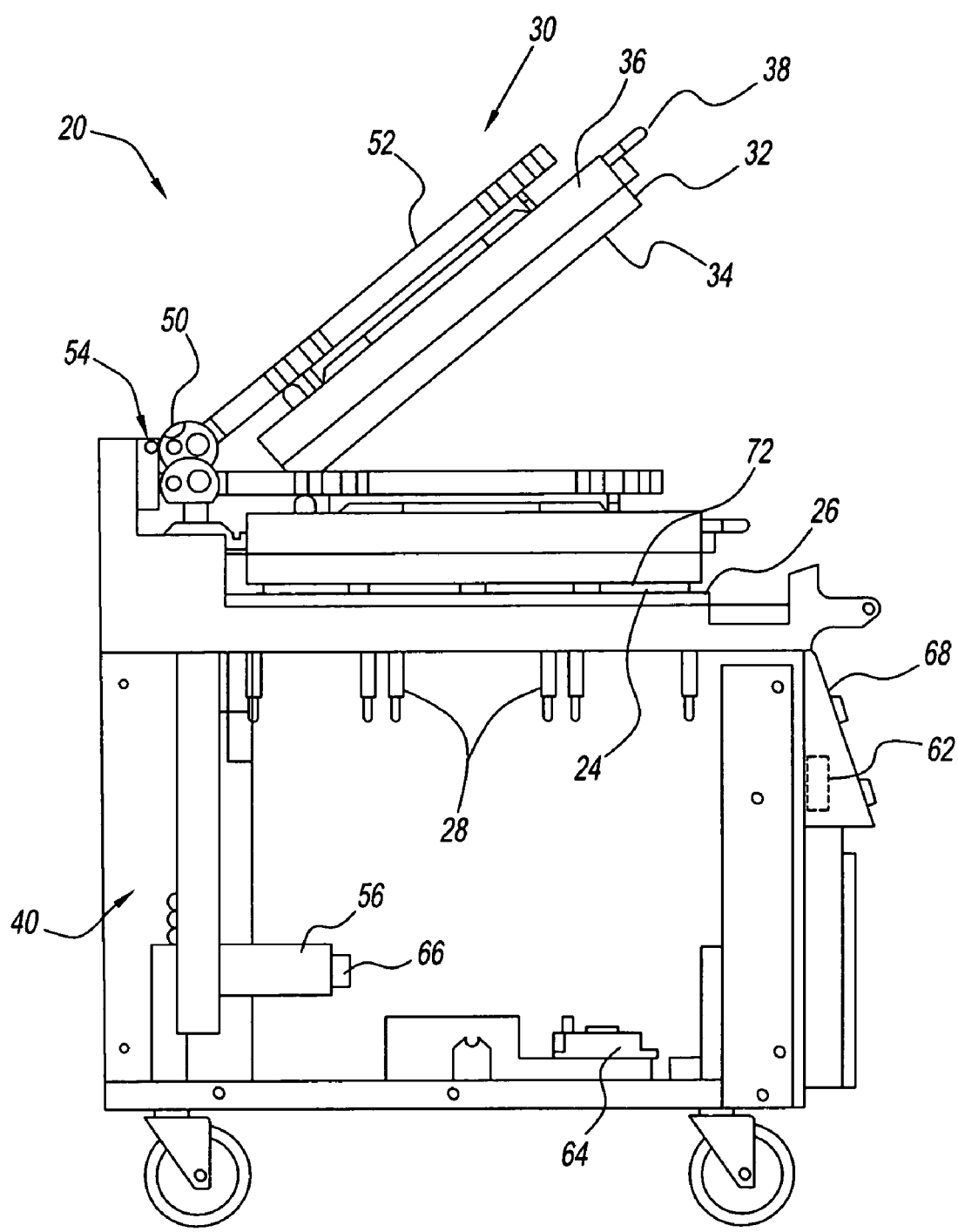
FIG. 2 is a side view of the two-surfaced cooking apparatus of FIG. 1.
Figure 3:
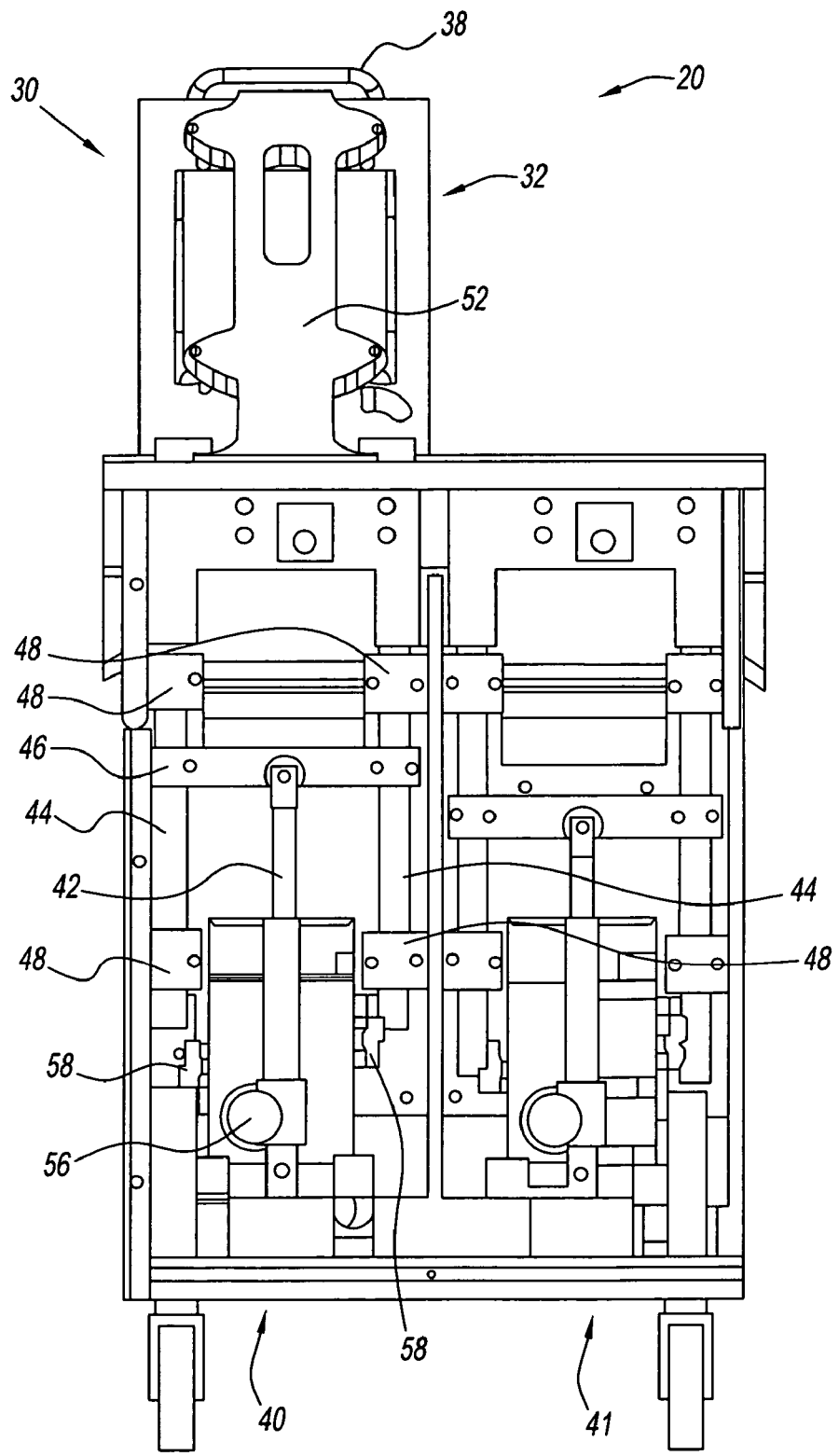
FIG. 3 is a rear view of the two-surfaced cooking apparatus of FIG. 1.

Referring to FIGS. 1-3, a two-surfaced cooking apparatus of the present invention comprises a support structure 22 to which a lower (first) cooking platen 24 is horizontally mounted. Lower platen 24 has a smooth level cooking surface 26 on its upper side. Lower platen 24 is heated to cooking temperature by gas or electric means via heating elements 28 or equivalent gas burners.

A platen assembly 30 and a platen assembly 31 are movably mounted to the rear of support structure 22 by a positioning mechanism 40 and a positioning mechanism 41, respectively. As platen assembly 30 and platen assembly 31 are substantially identical, only platen assembly 30 will be described in detail. Platen assembly 30 comprises an upper (second) cooking platen 32 that has a surface 34. Preferably, surface 34 is heated to cooking temperature by heating elements (not shown) mounted within a casing 36. Upper platen 32 is either smaller than or equivalently sized to lower cooking platen 24. A handle 38 mounted on the front side of platen assembly 30 for manual manipulation thereof. Cooking apparatus 20 may have one or more upper platen assemblies. Although two upper platen assemblies are shown, other embodiments may have one or more than two upper platen assemblies. In a preferred embodiment, two or more separate upper platen assemblies are mounted over a single lower platen, allowing for greater flexibility for the cook/operator. Although lower platen 24 is shown as a single platen, it can be two or more platens in alternate embodiments.

Cooking apparatus 20 further includes a controller 62 (shown in FIG. 2) that is interconnected with heaters 28, a motor controller 64, a user interface 68 and one or two activation buttons 60. Controller 62 controls the cook cycle of cooking apparatus 20 and in so doing controls motor controller 64 and positioning mechanism 40 that imparts motion to platen assembly 30. User interface 68 includes a display and various user controls. Activation buttons 60 are disposed on the front of cooking apparatus for user control of platen assembly 30. Activation buttons 61 are disposed on the front of cooking apparatus for user control of platen assembly 31.

As positioning mechanism 40 and positioning mechanism 41 are substantially identical, only positioning mechanism 40 will be described in detail. Positioning mechanism 40 facilitates two distinct motions by platen assembly 30 between an uppermost or non-cooking position (see FIG. 3) to a cooking position. In FIGS. 1-3, platen assembly 30 is in the non-cooking position and platen assembly 31 is in the cooking position. In this embodiment, positioning mechanism 40 includes a linear actuator 42 that is linked to two vertical reciprocating shafts 44 by an actuator cross bar linkage 46. Actuator cross bar linkage 46 is clamped to vertical reciprocating shafts 44, which run through linear motion bearings 48. Vertical reciprocating shafts 44 are affixed to arm pivot/stop heads 50. A cantilever beam 52 runs through arm pivot/stop heads 50 through rotational pivot bearings 54. When platen assembly 30 is in its uppermost rotational position, linear actuator 42 is extended to its maximum position, vertical reciprocating shafts 44 and arm pivot/stop heads 50 are extended upward and to a position which forces the back end of cantilever beam 52 to contact rotational bearings 54. In this position, platen assembly 30 is at a predetermined angle in a range of about 45 degrees to about 60 degrees from the horizontal.

Positioning mechanism 40 further comprises a drive motor 56 and position sensor switches 58 (FIG. 3). Drive motor 56 is interconnected with motor controller 64. A pulse encoder 66 is associated with motor 56 and provides a pulse train to controller 62 when motor 56 is being driven. Position switches 58 are mounted on reciprocating shafts 44 to provide position information to controller 62. In alternate embodiments, position switches 58 may be eliminated.

Prior to a cook cycle, platen assembly 30 is in its non-cooking position. In response to user activation of activation buttons 60, controller 62 initiates a cook cycle by controlling motor controller 64 to drive motor 56 to cause positioning mechanism 40 to move platen assembly 30 from the non-cooking position to a cooking position. For example, platen assembly 31 is shown in the cooking position.

Positioning mechanism 40 causes platen assembly 30 to descend both vertically and through an arc caused by the cantilever weight of platen assembly 30 maintaining contact between rotational bearings 54 and the back of cantilever beam 52. When cantilever beam 52 and platen assembly 30 become parallel with lower platen 24, the stop portion of arm pivot/stop head 50 stops the rotational motion of cantilever beam 52 causing purely vertical motion of platen assembly 30 from this point and further down toward surface 26 of lower platen 24. When upper platen 32 makes contact with a food product 72, controller 62 responds by bringing upper platen 32 to an initial cooking position and initiating a cook procedure. During the cook procedure upper platen 32 may be moved based on the requirements of the cook procedure. For example, upper platen 32 may be moved due to changed food product thickness (loss of grease or water) or for applying more or less pressure to the food product at different times during the cook procedure.

When the cook procedure is completed, controller 62 controls motor controller 64 to drive linear actuator 42 to move platen assembly 30 vertically upward from the cooking position to the non-cooking position. The cantilever weight of upper platen 32 maintains contact between arm pivot/stop head 50 until the back of cantilever beam 52 makes contact with rotational pivot bearing 54. This movement ensures that platen assembly 30 is constantly parallel to lower platen 24 during this stage of upper platen travel. Once cantilever beam 52 makes contact with rotational pivot bearing 54 the vertical motion is changed to rotational motion to a point where platen assembly 30 is rotated through the predetermined angle to the non-cooking position. Controller 60 causes an audible signal to be sounded (e.g., about two seconds) prior to the start of upward movement of platen assembly 30 to alert the operator of impending upper platen movement.

The present invention provides a detector that provides a trigger signal as upper platen 32 makes contact with food product 72. Controller 62 responds to the trigger signal to control motor controller 64 to cause positioning mechanism 40 to bring upper platen 32 to the initial cooking position. At this time, controller 62 begins the cooking procedure. The detector is shown herein in several different embodiments.

Figure 5:
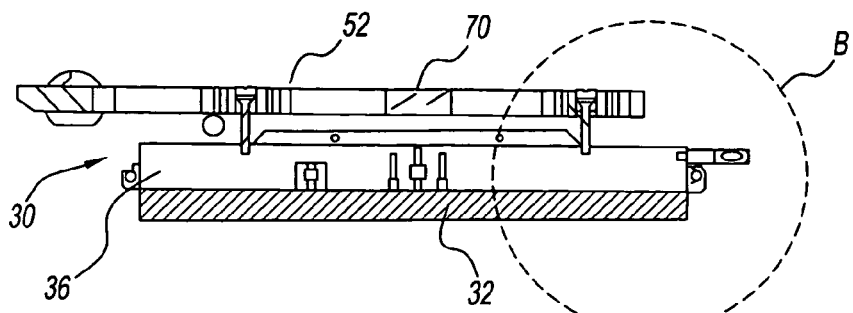
FIG. 5 is a cross-sectional view along line 5 of FIG. 4.
Figure 6:
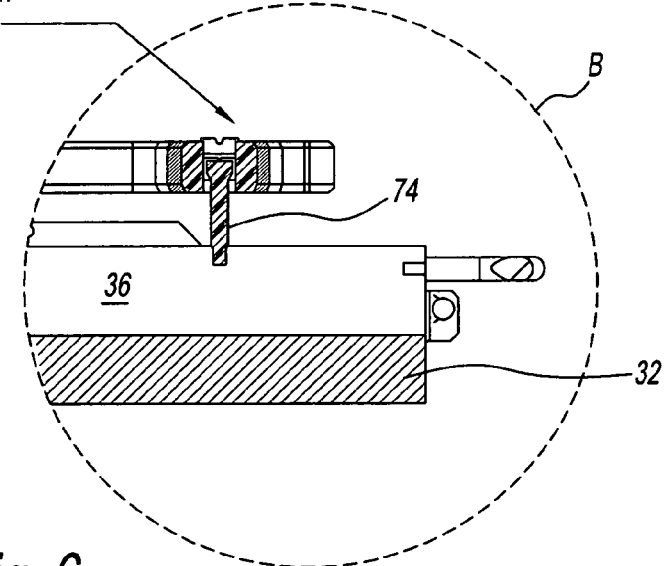
FIG. 6 is a view of detail B of FIG. 5.
Figure 4:
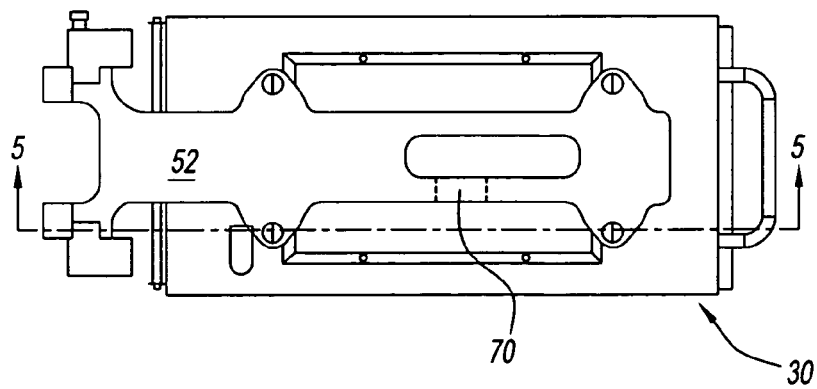
FIG. 4 is a top view of the upper platen assembly of the two-surfaced cooking apparatus of FIG. 1.

Referring to FIGS. 4-6, a detector 70 is disposed or attached to cantilever beam 52 of positioning mechanism 40. When upper platen 32 stops moving because it makes contact with a food product, its motion comes to a stop or continues to move based on the cooking parameters inputted into controller 62. Positioning mechanism 40 continues to move cantilever beam 52 vertically downward toward casing 36. Detector 70 senses a small change in the distance between cantilever beam 52 and casing 36 to provide the trigger signal that triggers positioning mechanism 40 to bring upper platen 32 to the initial cooking position.

Referring to FIG. 6, a fastener 74 fastens cantilever beam 52 to casing 36. Fastener 74 is mounted in cantilever beam 52 in a manner that allows it to float vertically when upper platen 32 is in contact with food product 72. Thus, when upper platen 32 makes contact with food product 72, upper platen 32 stops but cantilever beam 52 continues downwardly due to the floating action of fastener 74.

In this embodiment, detector 70 is preferably a proximity sensor, for example, model PRX+4400, available from Hermetic Switch Inc. Detector 70 may alternatively be a microswitch, for example, model E47BM530, available from Eaton/Cutler Hammer.

Detector 70 may alternatively be a touch sensor including dielectric sensing as well as piezo-electric pressure sensing. For example, the touch sensor may be model T107-A4E-073, available from Piezo Systems, Inc.

Detector 70 may alternatively be a sonar sensor that is attached to upper platen 32, lower platen 24 or support structure 22 to detect a sound change due to upper platen 32 contacting the food product. For example, the sonar sensor may be model EFR-RTQB40KS, available from Panasonic.

Although detector 70 is shown in a specific location, detector 70 can be positioned at any suitable location of cantilever beam 52 that permits detection of upper platen 32 contacting food product 72. For example, these locations include the front, back, either side, middle or other. In an alternate embodiment, detector 70 may include multiple detectors positioned at different locations.

Figure 7:
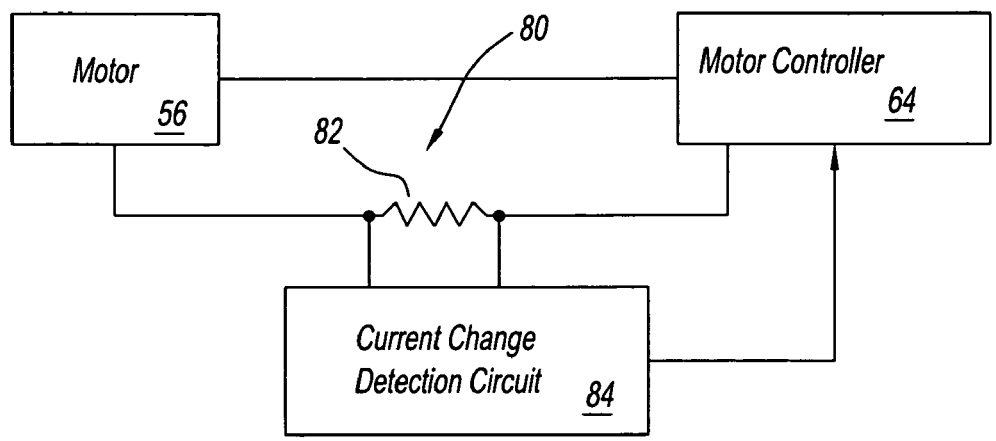
FIG. 7 is a block diagram of an alternate embodiment of the detector of the two-surfaced cooking apparatus of the present invention.

Referring to FIG. 7, a detector 80 monitors the motor current of drive motor 56. When upper platen 32 contacts food product 72, the motor current changes. Detector 80 detects this current change and signals motor controller 64. Detector 80 can either be separate from motor controller 64 or integral with motor controller 64. If integral, there is no need for detector 80 to signal motor controller 64. Detector 80 includes a current sensing resistor 82 (or other circuit for measuring current) connected in the motor current circuit. Detector 80 also includes a current change detection circuit 84 that provides the trigger signal to motor controller 64 when current change detection circuit 84 detects a change in motor current indicative of upper platen 32 making contact with food product 72. The trigger signal is supplied to controller 62.

Figure 8:
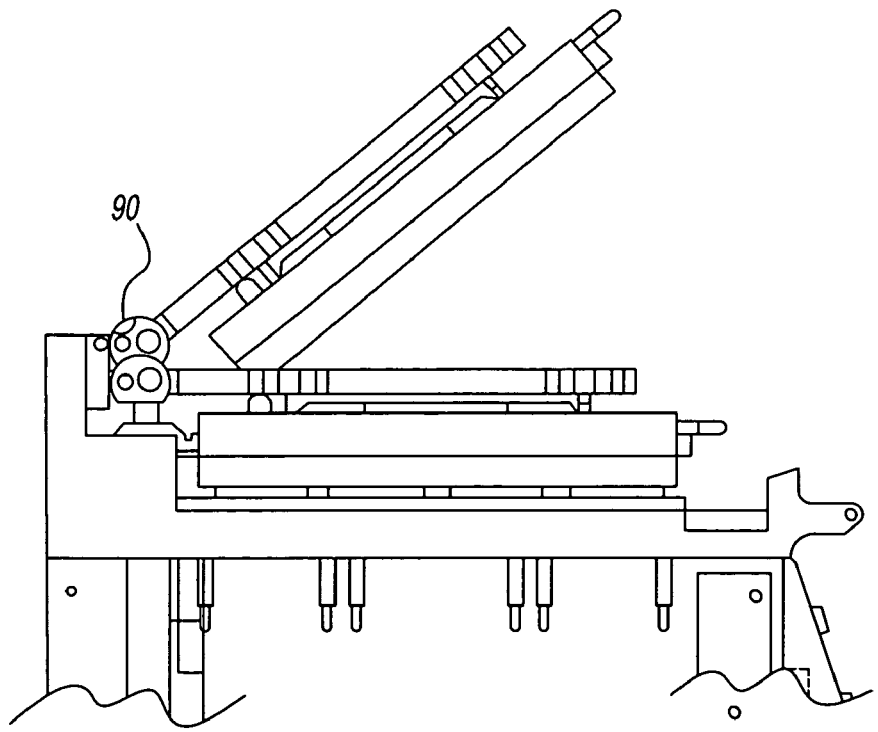
FIG. 8 is a side view of a portion of the two-surfaced cooking apparatus of FIG. 1 that depicts another embodiment of the detector.

Referring to FIG. 8, a detector 90 comprises a strain sensor attached in a location that detects a change in load after upper platen comes horizontal and when the weight of upper platen 32 is reduced by resting on food product 72. When detector 90 detects this change in strain, it provides a trigger signal to controller 62. Controller 62 then controls motor controller 64 to cause positioning mechanism 40 to bring upper platen 32 to the cooking position. Like detector 80, detector 90 may include a detection circuit (not shown) to detect when a change in the monitored strain signal is indicative of upper platen 32 making contact with food product 72.

Figure 9:
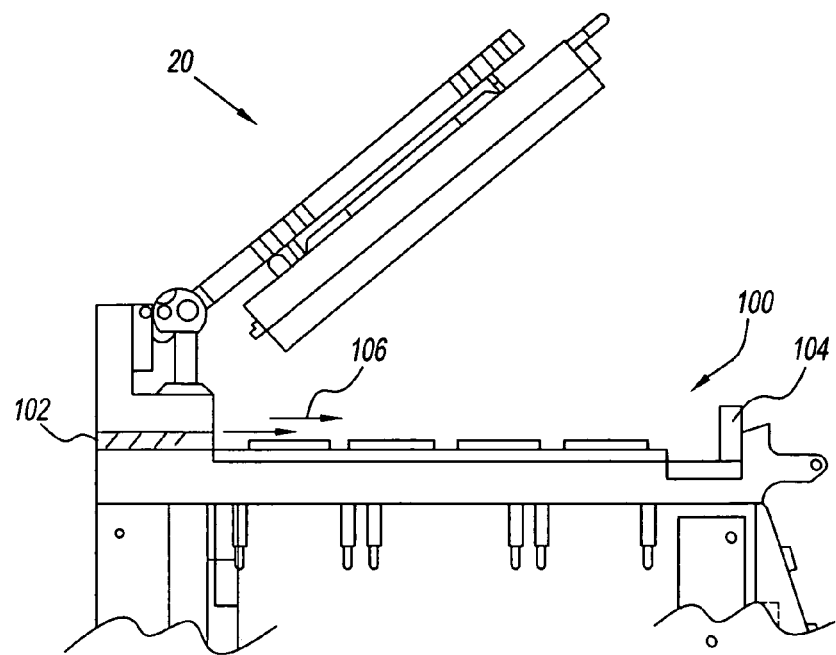
FIG. 9 is a side view of a portion of the two-surfaced cooking apparatus of FIG. 1 that depicts another embodiment of the detector.

Referring to FIG. 9, a detector 100 includes an optical transmitter 102 and an optical receiver 104 that are positioned to the rear and front, respectively, of cooking apparatus 20. Optical transmitter 102 provides an optical beam 106 from back to front at a level that will be interrupted by upper platen 32 at about the time it contacts the food product. Optical receiver 104 receives beam 106 and provides a trigger signal when upper platen 32 interrupts beam 106. Controller 62 uses the trigger signal to bring upper platen 32 to the cooking position. Optical beam 106 may be visible light or invisible, e.g., infrared.

Figure 10:
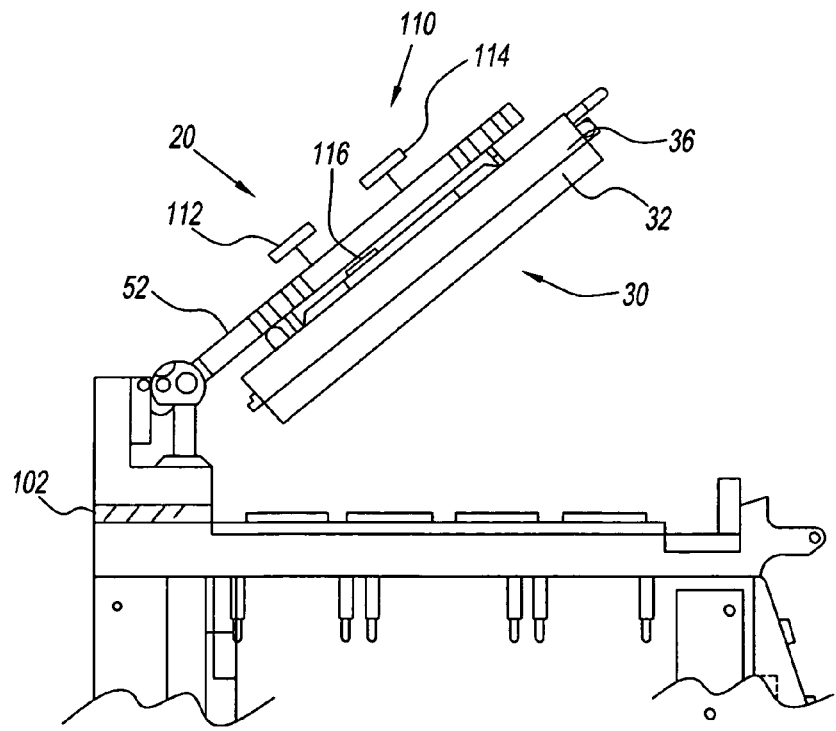
FIG. 10 is a side view of a portion of the two-surfaced cooking apparatus of FIG. 1 that depicts another embodiment of the detector.

Referring to FIG. 10, alternatively an optical detector 110 is mounted to cantilever beam 52. Thus, an optical transmitter 112 and an optical receiver 114 are mounted and spaced from one another by a gap such that a light beam emitted by optical transmitter 112 traverses the gap and is received by optical receiver 114. A shutter 116 is mounted on casing 36. When upper platen 32 is not in contact with the food product, shutter 116 is outside the gap between optical transmitter 112 and optical receiver 114. When upper platen 32 slows or stops, it contacts the food product, while cantilever beam 52 continues to move toward casing 36 such that shutter 116 enters the gap and interrupts the light beam. Optical receiver 114 responds by providing a trigger signal to controller 62. Controller 62 uses the trigger signal to bring upper platen 32 to the cooking position.

Figure 11:
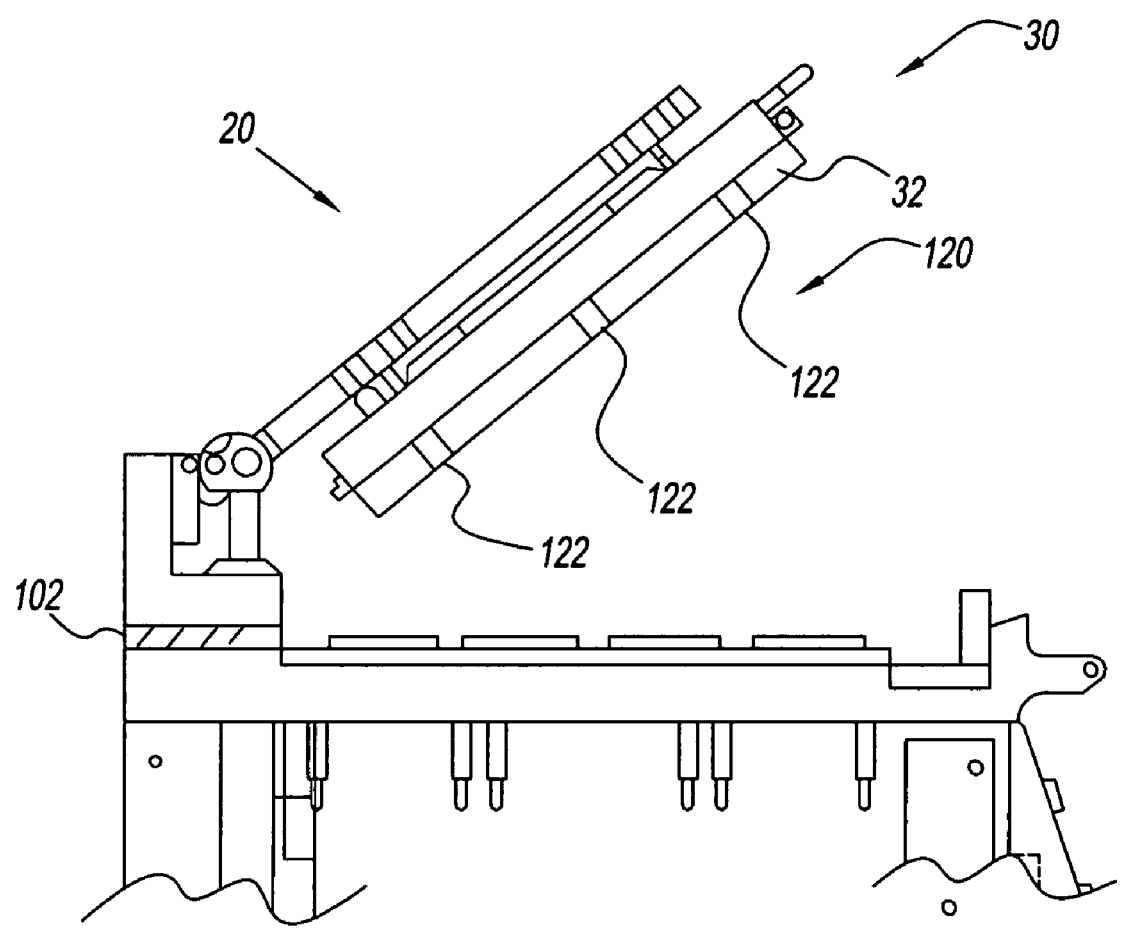
FIG. 11 is a side view of a portion of the two-surfaced cooking apparatus of FIG. 1 that depicts another embodiment of the detector.

Referring to FIG. 11, a detector 120 comprises a plurality of temperature sensors 122 disposed at various locations in upper platen 32. Temperature sensors 122 provide temperature signals to controller 62. When the operator starts a cooking cycle, controller 62 monitors the temperature sensor signals. When controller 62, based on the temperature sensor signals, determines that a given temperature drop in a specified amount of time has occurred, it controls motor controller 64 to cause positioning mechanism 40 to bring upper platen 32 to the cooking position.

It will be apparent to those skilled in the art that detection circuits can be used in any of the detectors 70, 80, 90, 100, 110 and 120 to discriminate the trigger signal from noise.

Figure 12:
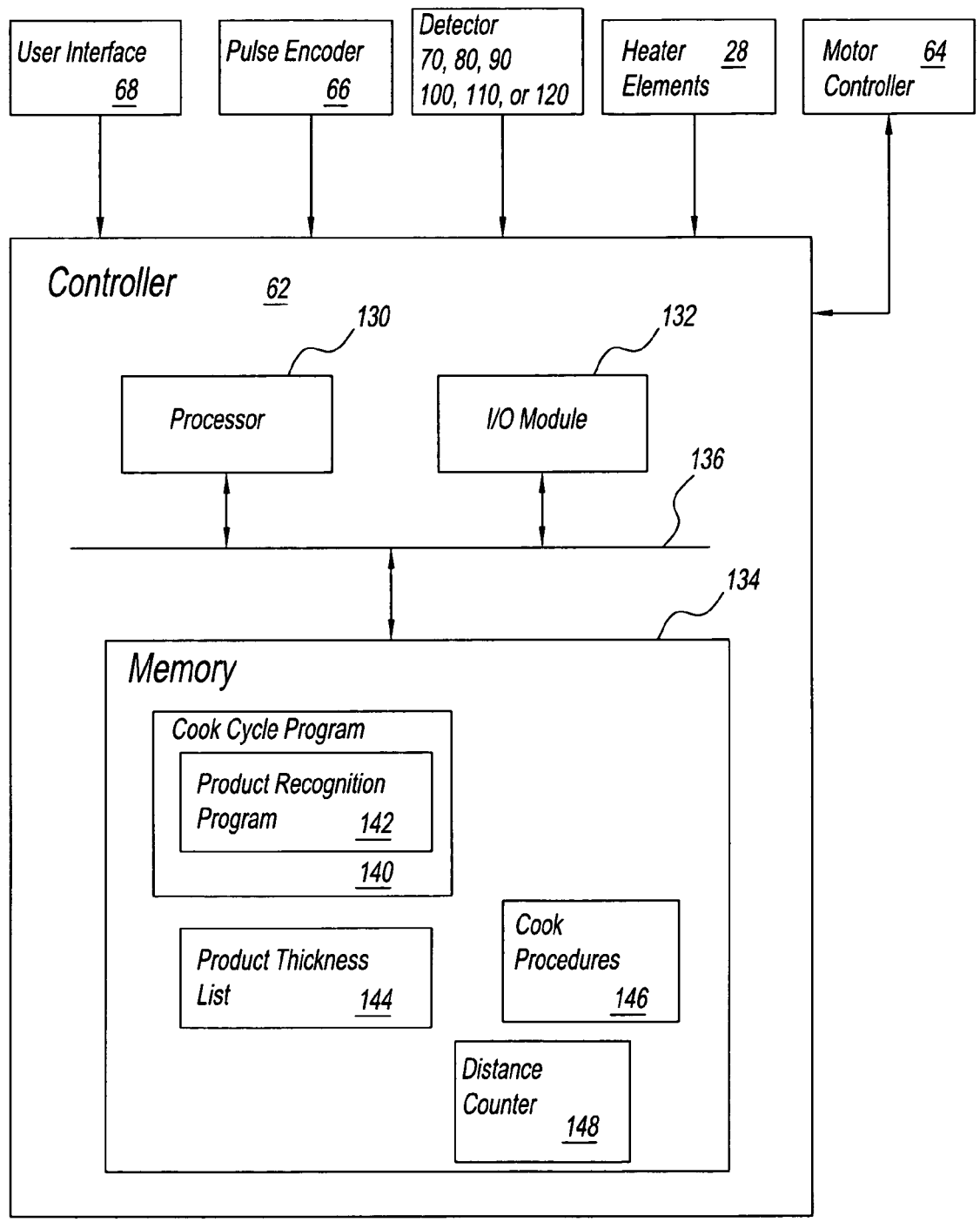
FIG. 12 is a block diagram of a preferred embodiment of the controller of the cooking apparatus of FIG. 1.

Referring to FIG. 12, controller 62 includes a processor 130 interconnected by a bus 136 with an input/output (I/O) module 132 and a memory 134. Memory 134 may be any suitable memory that includes, random access memory (RAM), read only memory (ROM), flash or other memory types or any combination thereof. Processor 130 may be any suitable processor that is capable of running programs that execute cook cycles including cook procedures. I/O module 132, contains interfaces to each of a plurality of input/output devices, including user interface 68, pulse encoder 66, detector 70, 80, 90, 100, 110 or 120, heater elements 28, motor controller 64 and any other input/output devices included in a cooking apparatus.

Memory 134 stores a plurality of programs and parameter data including a cook cycle program 140, a product thickness list 144, a set of cook procedures 146 and a distance counter 148. Cook procedures 146 include a set of cook procedures for use by cooking apparatus 20. For example, cook procedures 146 include a cook procedure for bacon, a cook procedure for a hamburger, a cook procedure for a chicken patty and so on.

A cook procedure, for example, may simply be a cook time or may also include temperatures for different portions of the cook time, different pressures and/or gap distances for upper platen 32 at different portions of the cook time.

Cook cycle program 140 includes a product recognition program 142 that recognizes a food product 72 currently on the grill surface 26 of lower platen 24 of FIGS. 1-6. This recognition is based on a travel distance of upper platen 32 measured between a reference point to a position at which it makes contact with food product 72. When cooking apparatus 20 is first started from a cold start, a preheat mode is used before food product 72 can be placed on lower platen 24. In the preheat mode, platen assembly 30 is lowered until it comes to a stop on lower platen 24 and engages detector 70. The heaters for lower platen 24 and upper platen 32 are turned on and the platen surfaces are heated to their preset temperatures.

After upper platen 32 has been preheated, platen assembly 30 is raised to its upper most non-cooking position to allow the operator to safely place food product 72 on lower platen 24. As platen assembly 30 begins to rise,
cantilever beam 52 reaches the end of the float distance, detector 70 is released from its detected state and generates a trigger signal that controller 62 uses as the reference point. This reference point represents a reference count value, e.g., zero, of surface 26 of lower platen 24.

As platen assembly 30 continues to rise, encoder pulses are counted from the reference point to the non-cooking position. Controller 62 records the total count value from the reference point to the upper most non-cooking position, which represents a predetermined reference count value. After food product 72 is placed on lower platen 24, platen assembly 30 is again lowered. When upper platen 32 contacts food product 72, detector 70 generates a trigger signal, which controller 62 uses to record the encoder pulse count value at the time of contact with food product 72. The product thickness is represented by the difference between the pulse count value at the food product contact time and the predetermined reference count value.

It will be apparent to those skilled in the art that other techniques of measuring the travel distance can be used. For example, the travel distance can be measured by the time that elapses between current triggered count value and the reference point value. The elapsed time, for example, is measured by counting pulses from a timing source, such as a clock. This elapsed time or pulse count is recorded in distance counter 148. Product recognition program 142 uses distance to recognize a product thickness and uses the recognized product thickness to select a product cook procedure from cook procedures 146 that matches the product thickness.

Figure 13:
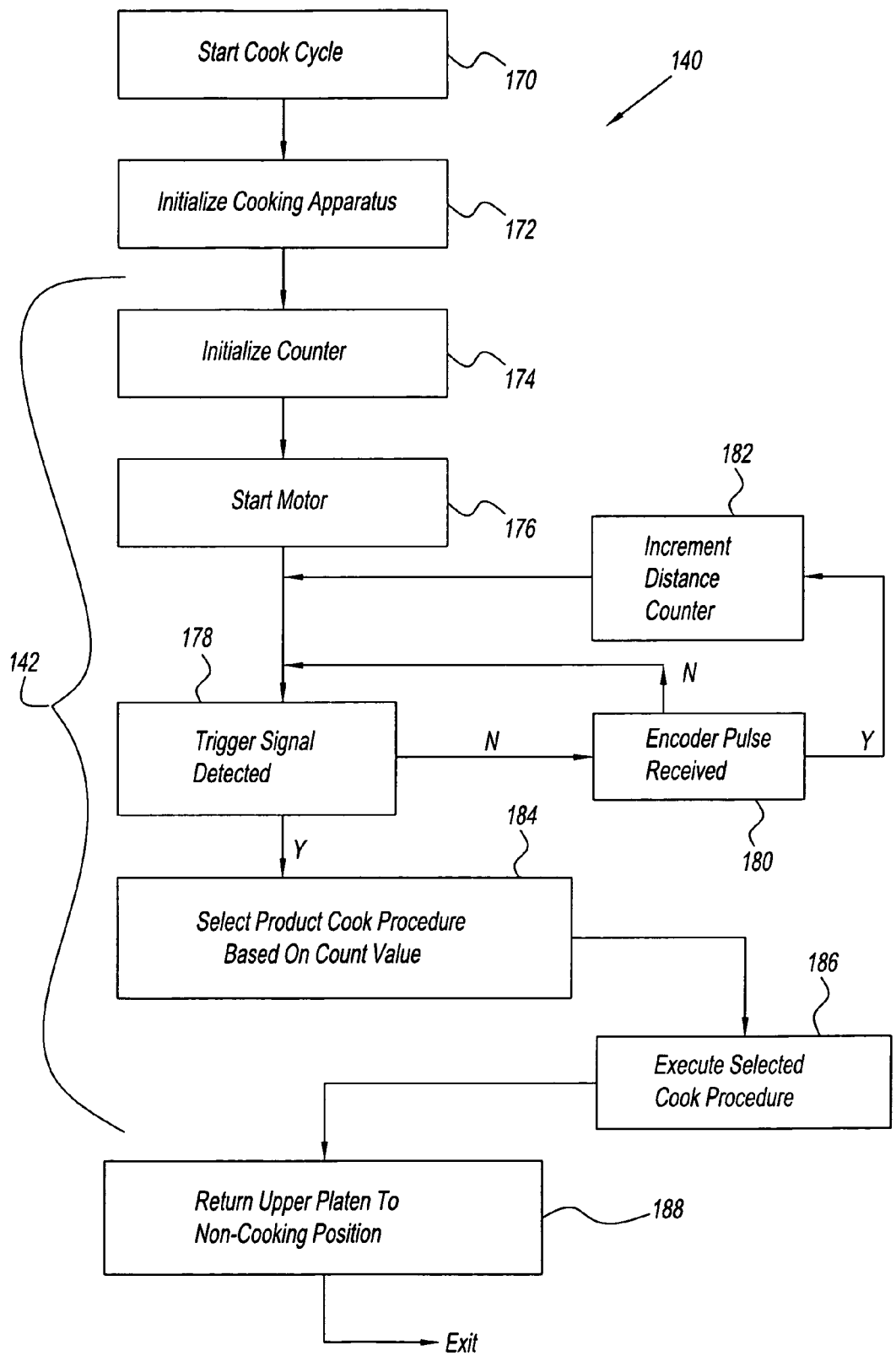
FIG. 13 is a flow diagram for the product recognition program of the controller of FIG. 12.

Referring to FIG. 13, cook cycle program 140 begins at step 170 by starting a cook cycle. Step 170 is performed in response to the operator activating activation button 60. At step 172 cooking apparatus 20 is initialized. For example, heating elements 28 are turned on and other preliminary operations (not germane to the present invention) are performed. Once cooking apparatus 20 is initialized, product recognition program 142 is executed.

At step 174, distance counter 148 is initialized to a reference value, e.g., zero. At step 176 motor 56 is started. Processor 130 provides one or more command signals via I/O module 132 to motor controller 64 to provide drive current to motor 56. This causes positioning mechanism 40 to lower upper platen 32 from its non-cooking position. At step 178, there is a determination of whether a trigger signal has been received from the detector (70, 80, 110, 110 or 120). If not, at step 180 it is determined if an encoder pulse has been received. If not, control returns to step 178. If step 180 determines that an encoder pulse has been received, at step 182 distance counter 148 is incremented. It will be appreciated by those skilled in the art that distance counter 148 could also be decremented from the reference value. Control then returns to step 178 and steps 178, 180 and 182 iterate until step 178 detects a trigger signal.

If step 178 determines that a trigger pulse has arrived, at step 184 a product cook procedure is selected from cook procedures 146 based on the count value of distance counter 148 as of the arrival of the trigger pulse. At step 186 the selected cook program is executed. When step 186 is completed at step 188 upper platen 32 is returned to its non-cooking position. To perform step 188, processor 130 provides one or more command signals via I/O module 132 to motor controller 64 to provide drive current to motor 56. This causes positioning mechanism 40 to raise upper platen 32 from its cooking position to its non-cooking position.

More specifically, step 184 matches the trigger count value of distance counter 148 with count values for different product thicknesses for the food products stored in product thickness list 144. That is, each count value stored in product thickness list 144 is indicative of a corresponding product thickness of the food product of a corresponding cook procedure. If the trigger count value of distance counter 148 is in-between two of the count values in product thickness list 144, the count value closest to the trigger count value is used to select a corresponding cook procedure from cook procedures 146.

In an alternate embodiment, product thickness list 144 stores a thickness window for the product of each cook procedure. The thickness window is defined by an upper and a lower count value plus or minus a tolerance. The thickness window within which the trigger count value falls is used to select the corresponding cook procedure from cook procedures 146. If the trigger count value falls between two thickness windows, the closest thickness window is used. For example, the predetermined thickness could be 0.500±0.060 inch.

During a programming operation, product thickness list 144 and product cook procedures 146 are populated with respective thickness count values and cook procedures for the food products that are to be cooked with food cooking apparatus 20. The thickness count values and cook procedures can be entered, for example, via a keyboard or other input device (not shown) either via a wired connection or a wireless link.

Figure 14:
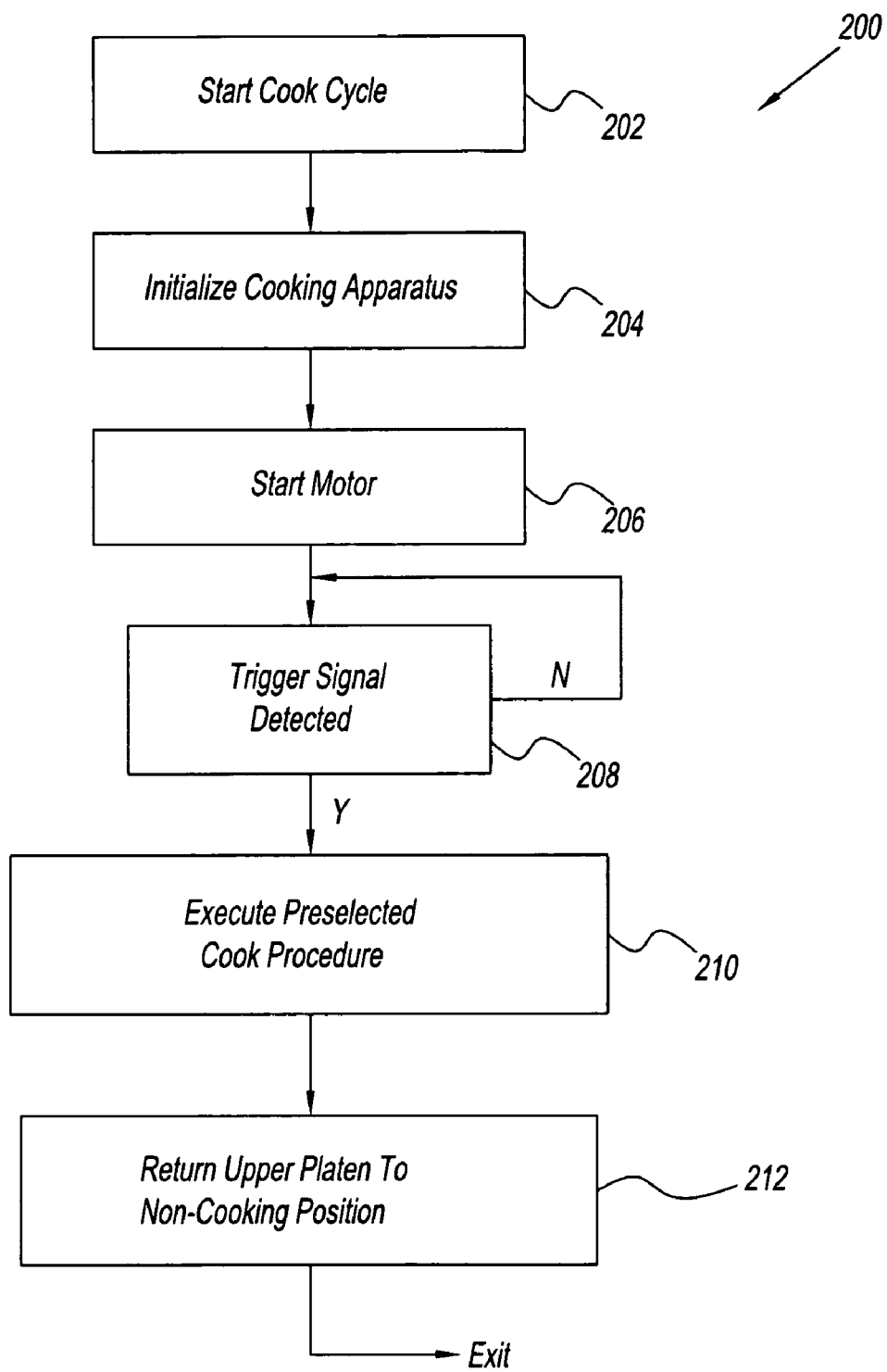
FIG. 14 is a flow diagram of another embodiment of a program that can be used with the cooking apparatus of FIG. 1.

Referring to FIG. 14, an alternate embodiment of the cook cycle program responds to the trigger signal to execute a cook procedure that is pre-selected by the operator, for example, from user interface 68. A cook cycle program 200 begins at step 202 by starting a cook cycle. Step 202 is performed in response to the operator activating activation button 60. At step 204 cooking apparatus 20 is initialized. For example, heating elements 28 are turned on and other preliminary operations (not germane to the present invention) are performed.

At step 206 motor 56 is started. Processor 130 provides one or more command signals via I/O module 132 to motor controller 64 to provide drive current to motor 56. This causes positioning mechanism 40 to lower upper platen 32 from its non-cooking position. At step 208, there is a determination of whether a trigger signal has been received from the detector (70, 80, 110, 110 or 120). If not, then step 208 repeats. If step 208 determines that a trigger signal has been received, then at step 208 the pre-selected cook procedure is executed. When the pre-selected cook procedure has been completed, then at step 212 upper platen 32 is returned to its non-cooking position. Processor 130 provides one or more command signals via I/O module 132 to motor controller 64 to provide drive current to motor 56. This causes positioning mechanism 40 to raise upper platen 32 from its cooking position to its non-cooking position.

The cooking program or procedure for any food product can include a stage or multiple stages that causes the upper platen to raise from the food product a programmed distance and time duration to release moisture.

Figure 15:
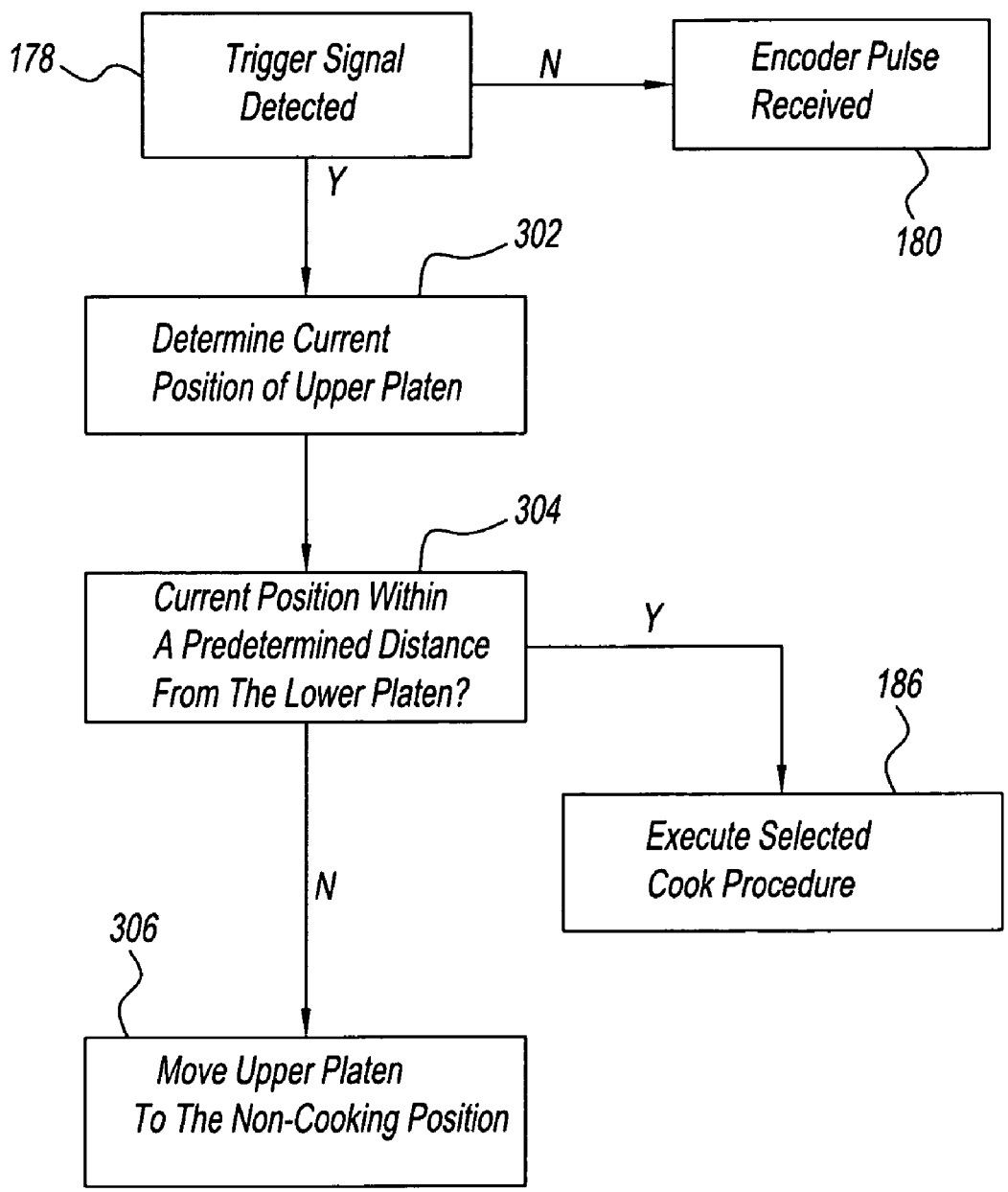
FIG. 15 is a flow diagram of a moisture release control of the present invention.

Referring to FIG. 15, a moisture release feature of the present invention comprises a moisture release control 360 that can be executed during a cooking procedure and executed by controller 62. Moisture release control 360 at step 362 raises upper platen 32 to a predetermined distance above the food product. As upper platen 32 rises, the trigger signal changes from on to off. Controller 62 maintains upper platen 32 in this location for a predetermined time T selected for moisture release. When the predetermined time T expires, step 364 lowers upper platen 32 until the trigger signal is detected. That is, upper platen 32 makes contact with the food product. This procedure can be repeated as many times as desired for a given food product.

During the cooking process the platen temperature profiles/energy consumption is monitored by controller 62. This data is compared to reference data and used to adjust the cooking time to compensate for differences in quantity, density, food starting temperature (frozen/unfrozen) and the like. Controller 62 then compensates the cooking time longer or shorter based on the temperature profile for the particular product thickness for better non-full or partial load cooking operations and improved product quality. Controller 62 can also use the temperature profile/energy consumption and product thickness to determine the proper cooking program for the energy over time to select food product (e.g., more dense/less dense products and/or frozen/thawed products) being cooked.

The temperature drop during the cooking cycle or part of the cooking cycle, together with the information of the heaters turn-on and turn-off pattern will also give information regarding the cooking product thermal load. The thermal load will change dependent on several variables such as; quantity of food products, initial temperature of products, water content of products, density of food products.

Figure 16:
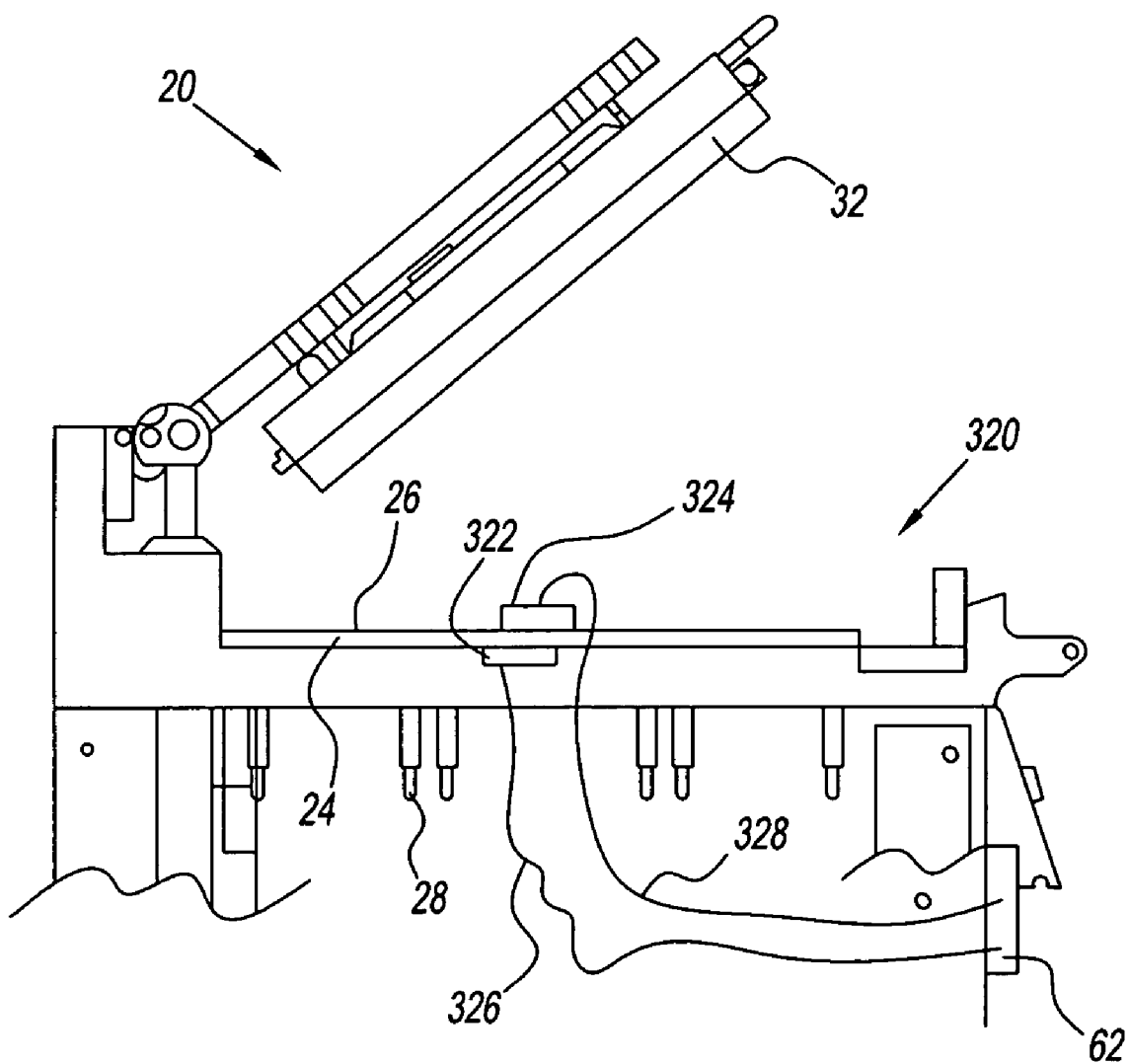
FIG. 16 is a graph of temperature vs. time for a cook procedure.

Referring to FIG. 16, curve 370 is a reference plot of temperature of one of the platens (e.g., lower platen 24) versus time for a cooking procedure for a reference quantity of a particular food product. At the beginning of the cook cycle, lower platen 24 and upper platen 32 are preheated to a set temperature Tset for the reference quantity of the particular food products. Curve 370 is at Tset at time t0. At this time, the reference quantity of food products has been placed on lower platen 24 and the operator is activating motion of upper platen 32 toward the food products. The temperature of lower platen 24 begins to drop. By time t1, upper platen has come into contact with the food products. At time t2, the temperature of lower platen 24 reaches a minimum temperature Tmin and begins to rise. By time t4, the temperature of lower platen has returned to the set temperature. Curve 370 is for a simple cooking procedure in which the reference quantity of the food products are cooked at a constant set temperature Tset with no moisture release or other functions that cause upper platen to move out of contact with the food products. It will be apparent to those skilled in the art that cooking procedures can also involve such movements of upper platen and different set temperatures for various stages of the cooking procedure. Curve 370 constitutes a reference temperature curve for the cooking procedure for the reference quantity of the particular food products. Similar curves are generated for cooking procedures for other food products. Data from these curves is stored for use during the actual cooking of the food products. For example, this data comprises the temperatures of curve 370 taken at one or more desired sample times between t0 and t4.

Figure 17:
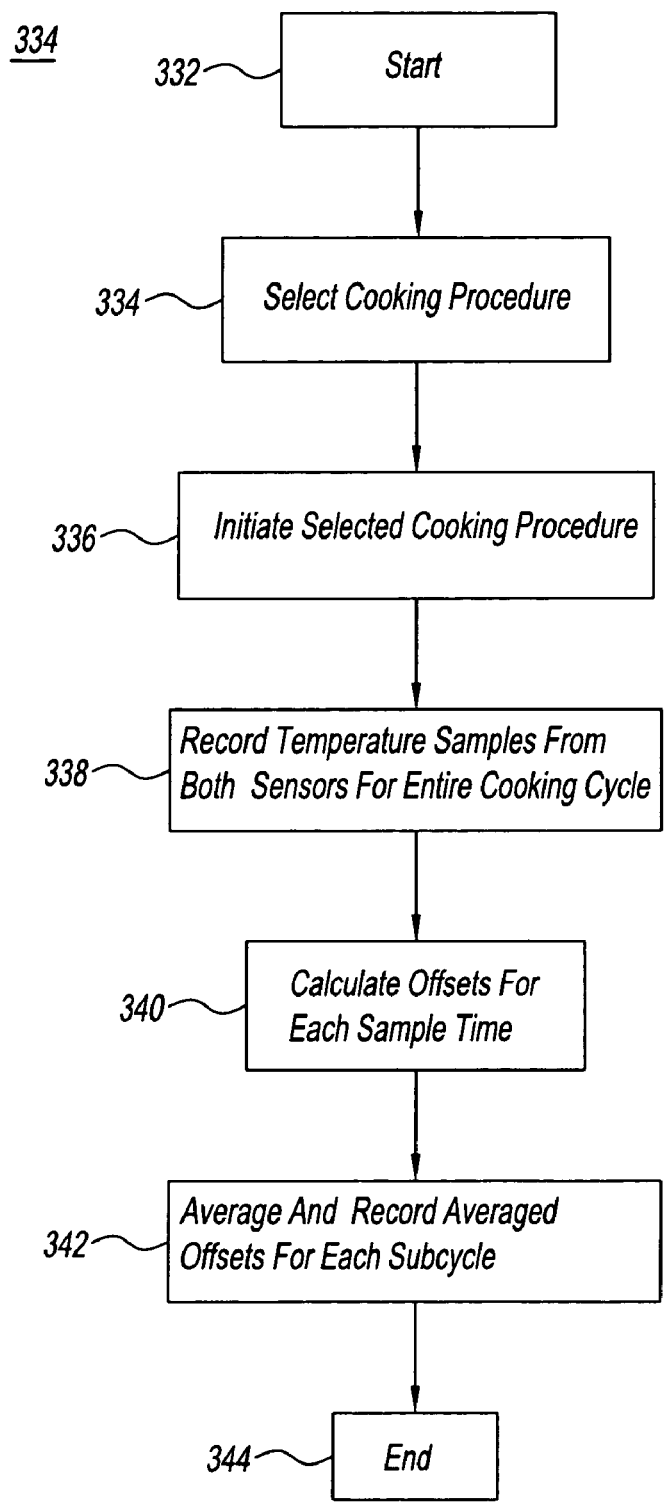
FIG. 17 is a flow diagram of a cook time compensation program of the present invention.

Referring to FIG. 17, a cook time compensation program 380 is executed either as part of product recognition program 142 or in other cooking applications. By way of example, cook time compensation program 380 will be described as being executed in conjunction with product thickness recognition program 142. Cook time compensation program 380 begins with step 382 with the initiation of a cook procedure for the particular food products. Lower and upper platens 24 and 32 are preheated to the set temperature Tset. Upper platen 32 is then raised and the operator places a current quantity of the particular food products on lower platen 24. The operator also causes upper platen to begin moving toward the food products. During the period from t0 to t4 one or more temperature samples are taken at step 384. Step 386 compares these temperature samples with the reference temperature samples taken from curve 370. In some embodiments, the comparison will only consider the minimum Tmin of the current food products and the Tmin of the reference food products. Step 386 determines if any of the current temperature samples deviate above or below the reference temperature samples by more than a predetermined amount. If not, cook time compensation program 380 ends at 390. That is, the quantity of food products being cooked is substantially equal to the reference quantity of food products. If there is a deviation by more than a predetermined amount, step 388 adjusts the cooking time. For example, if the deviation is above the reference temperature, the cooking time is shortened. If the deviation is below the reference temperature, the cooking time is lengthened. Cook time compensation program 380 then ends at 390.

As described above, product recognition program 142 selects a cook procedure based on a count value that represents the food product thickness or height. According to the present invention, an alternate product recognition program 400 uses the product thickness or height and a user entered food category to determine a cook time for the product.

Figure 18:
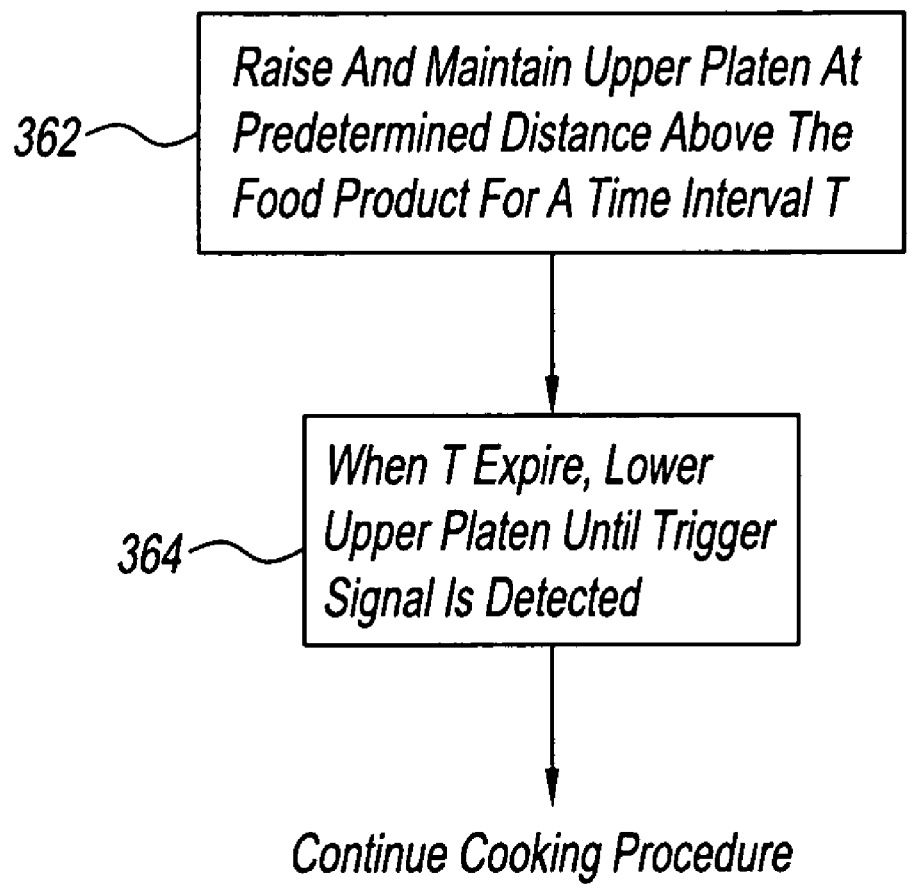
FIG. 18 is a flow diagram of another embodiment of a product recognition program of the present invention.

Referring to FIG. 18, a product recognition program 400 begins at step 402 by posting or recording the product thickness or height as or based on the count value determined by steps 170-182 of FIG. 13. Step 404 determines the food category entered by a user or operator of cooking apparatus 20. For example, buttons for different food categories, such as beef, chicken, vegetable and other categories, can be provided on the user interface 68. When placing the food product on the lower platen 24, the user selects a food category. Step 406 gets a constant k that is based on the food product category determined by step 404. Step 408 determines a cook time based on the product thickness and the entered food category. The cook time is calculated based on the relationship of cook time equals (product thickness)$^2$×k. Step 410 uses the cook time to cook the food product.

Using user interface 68, the operator can manually select between cooking products using product recognition program 142 or product recognition program 400.

Figure 19:
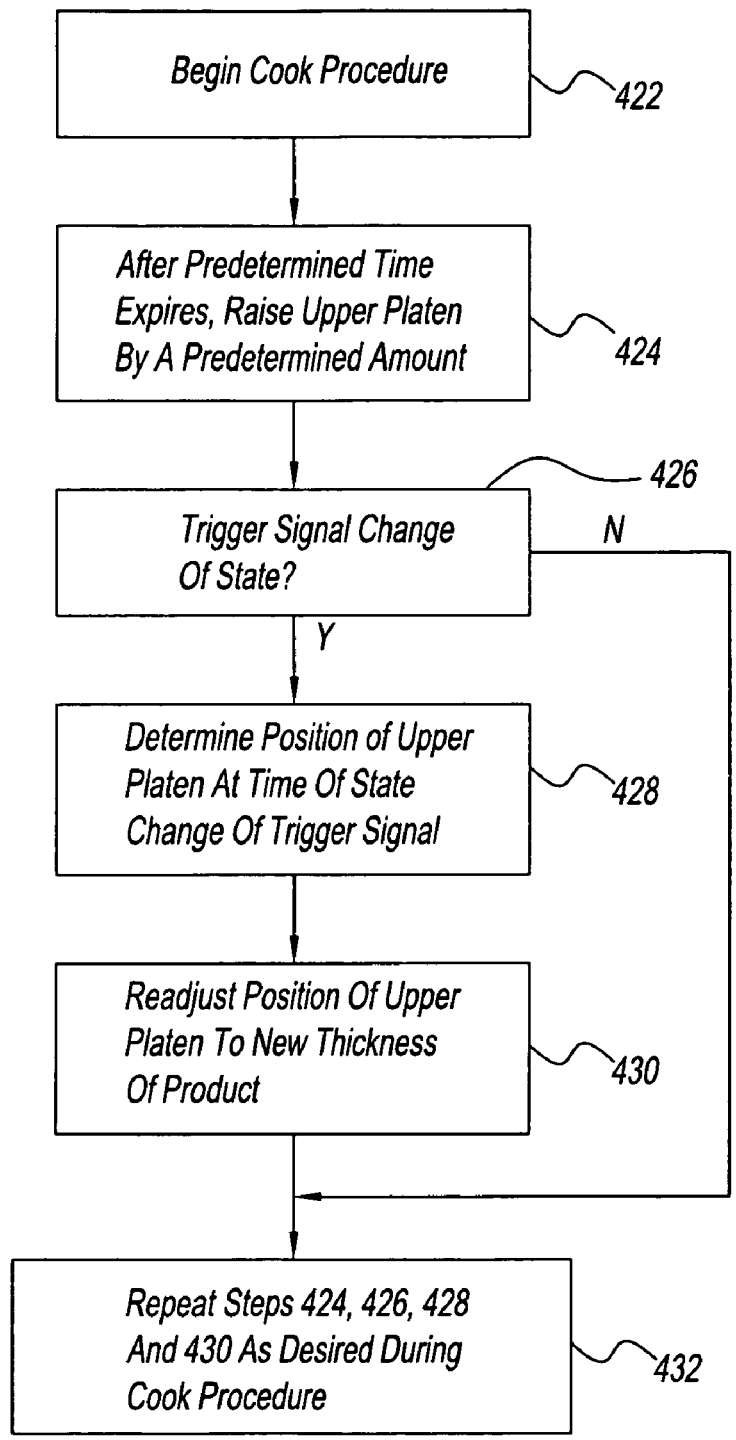
FIG. 19 is a flow diagram of a product thickness change control of the present invention.

Referring to FIG. 19, a product thickness change control 420 is used during a cook procedure to detect changes (expanding or shrinking) in product thickness that occur during cooking. Product thickness change control 420 begins at step 422 with the start of the cook procedure. Step 424 waits for a predetermined time (e.g., 40% of the cook time) to expire and then raises upper platen 32 by a predetermined amount (e.g., 0.25 inch for a hamburger patty). Step 426 determines if there has been a change in state of the trigger signal. If not, step 432 is performed. If yes, step 428 determines the position of upper platen 32 at the time of state change of the trigger signal. For example, the pulse count of the distance counter (see steps 180 and 182 in FIG. 13) would be decremented if the state changes when upper platen 32 is raised. Step 430 then readjusts the position of the upper platen based on the new thickness of the food product. Step 432 repeats steps 424, 426, 428 and 430 as desired during the cook procedure.

In any of the processes described above, controller 62 can be programmed to maintain either a full weight or a partial weight of upper platen 32 on the food product during the cooking program.

The present invention having been thus described with particular reference to the preferred forms thereof, it will be obvious that various changes and modifications may be made therein without departing from the spirit and scope of the present invention as defined in the appended claims.

What is claimed is:

1. A cooking apparatus comprising:
    a first platen and a second platen disposed in spaced apart relationship to one another;
    a positioning mechanism that moves said second platen toward and/or away from said first platen;
    a float mechanism that allows said second platen to float vertically when in contact with a food product on said first platen, and
    a controller that executes a cooking procedure to cook one or more food products disposed on a grill surface of said first platen with said second platen having one or more cooking positions, wherein a first one of said cooking positions is based on a first thickness of said food products, and wherein said controller during said cooking procedure raises and lowers said positioning mechanism and/or said second platen based on changes in thickness of said food products.

2. The cooking apparatus of claim 1, wherein said controller executes a product thickness change control during said cooking procedure to determine a second one of said cooking positions based on a second thickness of said food products and to lower said positioning mechanism and/or said second platen to said second cooking position.

3. The cooking apparatus of claim 2, further comprising a detector disposed to provide a signal as said second platen makes contact with said food products, and wherein said controller responds to a first indication and a second indication of said signal to move said positioning mechanism and/or said second platen into said first and second cooking positions, respectively.

4. The cooking apparatus of claim 3, wherein said product thickness change control causes said controller to raise said positioning mechanism and/or said second platen from said first cooking position and, based on said second indication of said signal, causes said controller to move said positioning mechanism and/or said second platen to said second cooking position.

5. The cooking apparatus of claim 1, wherein said controller raises said second platen above said food product in a manner to release moisture from said food products.

6. A cooking apparatus comprising: a first platen and a second platen disposed in spaced apart relationship to one another;
a positioning mechanism that moves said second platen toward and/or away from said first platen; and
a controller that executes a cooking procedure to cook one or more food products disposed on a grill surface of said first platen with said second platen having a first cooking position based on a first thickness of said food products, wherein said controller during said cooking procedure raises and lowers said positioning mechanism and/or said second platen, wherein said controller raises said second platen above said food product in a manner to release moisture from said food products, and wherein said controller executes a moisture release control during said cooking procedure that raises said positioning mechanism and/or said second platen to a predetermined distance above a grill surface of said first platen, holds said second platen at said predetermined distance for a time T, and when said time T expires, lowers said positioning mechanism and/or said second platen toward said first platen.

7. The cooking apparatus of claim 6, wherein said second platen is lowered to a predetermined position.

8. The cooking apparatus of claim 7, wherein said predetermined position is a position at which the second platen makes contact with said food products.

9. The cooking apparatus of claim 6, wherein said controller executes said moisture control a plurality of times during said cooking procedure.

10. A cooking apparatus comprising:
a first platen and a second platen disposed in spaced apart relationship to one another;
a positioning mechanism that moves said second platen toward and/or away from said first platen; and
a controller that executes a cooking procedure to cook one or more food products disposed on a grill surface of said first platen with said second platen having a first cooking position based on a first thickness of said food products, wherein said controller during said cooking procedure raises and lowers said positioning mechanism and/or said second platen, wherein said controller raises said second platen above said food products in a manner to release moisture from said food products, and wherein during said cooking procedure said controller controls said positioning mechanism to raise said second platen to a predetermined distance above a grill surface of said first platen, to hold said second platen at said predetermined distance for a time T, and when said time T expires, to lower said second platen toward said first platen.

11. The cooking apparatus of claim 10, wherein said second platen is lowered to a predetermined position.

12. The cooking apparatus of claim 11, wherein said predetermined position is a position at which the second platen makes contact with said food products.

13. The cooking apparatus of claim 10, wherein said predetermined position is one of a plurality of predetermined positions to which said controller moves said second platen during said cooking procedure.

\* \* \* \* \*